(12) United States Patent
Yoshitomi et al.

(10) Patent No.: US 11,308,801 B2
(45) Date of Patent: Apr. 19, 2022

(54) DRIVING ASSISTANCE APPARATUS AND DRIVING ASSISTANCE METHOD

(71) Applicants: DENSO CORPORATION, Kariya (JP); TOYOTA JIDOSHA KABUSHIKI KAISHA, Toyota (JP)

(72) Inventors: Naoto Yoshitomi, Kariya (JP); Hajime Nagae, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 187 days.

(21) Appl. No.: 16/141,009

(22) Filed: Sep. 25, 2018

(65) Prior Publication Data
US 2019/0096247 A1    Mar. 28, 2019

(30) Foreign Application Priority Data
Sep. 28, 2017    (JP) .............................. JP2017-189138

(51) Int. Cl.
G06K 9/00    (2006.01)
G08G 1/0967    (2006.01)
G08G 1/0962    (2006.01)

(52) U.S. Cl.
CPC ....... *G08G 1/0967* (2013.01); *G06K 9/00818* (2013.01); *G08G 1/09623* (2013.01)

(58) Field of Classification Search
USPC ................................ 382/103, 181; 348/148
See application file for complete search history.

(56) References Cited

U.S. PATENT DOCUMENTS

| 8,174,570 B2* | 5/2012 | Yoneyama | G06K 9/00818 348/135 |
| 2009/0074249 A1* | 3/2009 | Moed | G06K 9/00818 382/104 |
| 2012/0046855 A1* | 2/2012 | Wey | G06K 9/00791 701/117 |
| 2012/0143456 A1* | 6/2012 | Ueda | B60W 40/06 701/93 |
| 2012/0223845 A1* | 9/2012 | Schumann | B60W 50/0097 340/995.19 |
| 2014/0032072 A1* | 1/2014 | Yoshihama | B60T 7/22 701/70 |

(Continued)

FOREIGN PATENT DOCUMENTS

| JP | H07-110899 A | 4/1995 |
| JP | 2015-035165 A | 2/2015 |

(Continued)

*Primary Examiner* — Kathleen Y Dulaney
(74) *Attorney, Agent, or Firm* — Maschoff Brennan (57) ABSTRACT

In an apparatus for assisting a driver of a vehicle in driving the vehicle, a road sign recognizer is configured to recognize a road sign from an image captured by a vehicle-mounted imager. A turn detector is configured to detect a turning action of the vehicle. A notifier is configured to notify the driver of the vehicle of road sign information representing the road sign recognized by the road sign recognizer. The notifier is further configured to, if the turning action of the vehicle is detected by the turn detector, withhold notifying the driver of the vehicle of the road sign information representing the road sign recognized by the road sign recognizer within a predetermined period of time during the turning action.

6 Claims, 4 Drawing Sheets

(56) References Cited

U.S. PATENT DOCUMENTS

| | | | | |
|---|---|---|---|---|
| 2015/0035981 A1* | 2/2015 | Otsuki | ............... | G08G 1/09623 |
| | | | | 348/148 |
| 2016/0350605 A1 | 12/2016 | Yoshitomi et al. | | |
| 2016/0350606 A1 | 12/2016 | Yoshitomi et al. | | |
| 2017/0076606 A1* | 3/2017 | Gupta | .................... | B60Q 9/008 |
| 2017/0092125 A1* | 3/2017 | Fujimaki | ............ | G08G 1/09623 |
| 2018/0290657 A1* | 10/2018 | Ryne | .................. | G06K 9/00818 |

FOREIGN PATENT DOCUMENTS

| | | | |
|---|---|---|---|
| JP | 2015-075891 A | 4/2015 | |
| JP | 2016-224717 A | 12/2016 | |
| JP | 2016-224718 A | 12/2016 | |

\* cited by examiner

DRIVING ASSISTANCE APPARATUS AND DRIVING ASSISTANCE METHOD

CROSS-REFERENCE TO RELATED APPLICATION

This application is based on and claims the benefit of priority from earlier Japanese Patent Application No. 2017-189138 filed on Sep. 28, 2017, the description of which is incorporated herein by reference.

BACKGROUND

Technical Field

The present disclosure relates to a vehicle driving assistance apparatus and a vehicle driving assistance method.

Related Art

Conventionally, a driving assistance apparatus is known that is configured to recognize a road sign from an image of surroundings of a vehicle captured by a vehicle-mounted camera, display road sign information representing the recognized road sign on a monitor in a passenger compartment to notify a driver of the vehicle of the road sign information, thereby implementing driving assistance. Such a driving assistance apparatus needs to provide accurate road sign information to the driver of the vehicle in response to a driving state of the vehicle.

For example, JP-A-2016-224717 discloses a technique configured to suspend notification of the road sign information to the driver, if a turning action of the vehicle is detected based on a speed of the vehicle and manipulation information of a turn indicator.

For example, a road sign installed at an intersection may be recognized during a turning action of the vehicle. The technique disclosed in JP-A-2016-224717 can suspend notification of road sign information representing a road sign recognized prior to the vehicle reaching the intersection. However, this technique may fail to suspend notification of road sign information representing the road sign installed at the intersection recognized during the turning action of the vehicle.

In view of the above, it is desired to have a driving assistance technique for providing a notification of accurate road sign information to a driver of a vehicle during a turning action of the vehicle.

SUMMARY

One aspect of the disclosure provides an apparatus for assisting a driver of a vehicle in driving the vehicle. In the apparatus, a road sign recognizer is configured to recognize a road sign from an image captured by a vehicle-mounted imager. A turn detector is configured to detect a turning action of the vehicle. A notifier is configured to notify the driver of the vehicle of road sign information representing the road sign recognized by the road sign recognizer. The notifier is further configured to, if the turning action of the vehicle is detected by the turn detector, withhold notifying the driver of the vehicle of the road sign information representing the road sign recognized by the road sign recognizer within a predetermined period of time during the turning action.

In the apparatus configured as above, the notifier is configured to, if a turning action of the vehicle is detected by the turn detector, withhold notifying the driver of the vehicle of the road sign information representing the road sign recognized by the road sign recognizer within the predetermined period of time during the turning action. This configuration enables appropriately withholding notification of road sign information representing a road sign installed at an intersection during a turning action. For example, when the road sign recognizer has detected a road sign applied to a road going straight ahead of the intersection during a turning action of the vehicle, the notifier withholds notifying the driver of the vehicle of this road sign information. This configuration can provide a notification of accurate road sign information, thereby properly implementing driving assistance.

Another aspect of the disclosure provides a method for assisting a driver of a vehicle in driving the vehicle. The method includes: recognizing a road sign from an image captured by a vehicle-mounted imager; detecting a turning action of the vehicle; notifying the driver of the vehicle of road sign information representing the road sign recognized. The notifying the driver of the vehicle of road sign information includes withholding notifying the driver of the vehicle of the road sign information representing the road sign recognized within a predetermined period of time during the turning action, if the turning action of the vehicle is detected.

DESCRIPTION OF SPECIFIC EMBODIMENTS

Hereinafter, exemplary embodiments of the present disclosure will be described in detail with reference to the accompanying drawings, in which like reference numerals refer to like or similar elements and duplicated description thereof will be omitted.

Figure 1:
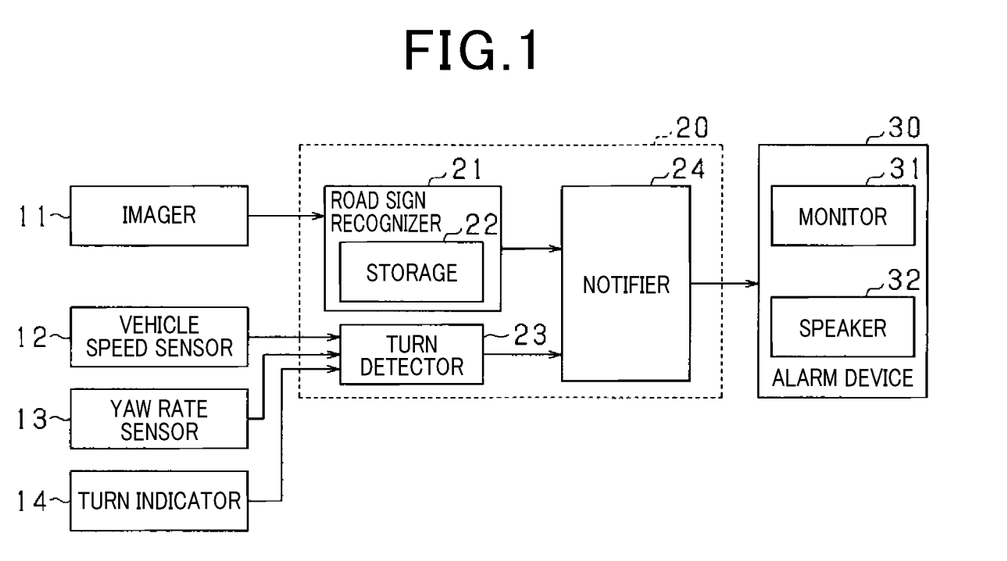
FIG. 1 is a block diagram of a driving assistance system in accordance with one embodiment of the present disclosure.

A driving assistance apparatus in accordance with one embodiment of the present disclosure is configured to provide vehicle driving assistance based on forward images captured by a vehicle-mounted imager. FIG. 1 illustrates a schematic configuration of the driving assistance apparatus of the present embodiment.

In FIG. 1, the imager 11 may include at least one of a charge-coupled device (CCD) camera, a complementary metal-oxide semiconductor (CMOS) image sensor, a near-infrared camera and the like. The imager 11 is disposed near the top end of a front windshield of the vehicle to capture images of surroundings of the vehicle including a road ahead of the vehicle. The vehicle carrying the driving assistance apparatus is hereinafter referred to as an own vehicle.

The driving assistance apparatus 20 may be configured as a microcomputer including a central processing unit (CPU), tangible, non-transitory computer-readable media, such as a flash memory, a read-only memory (ROM), and a random-access memory (RAM), and an input/output interface (I/O). Various functions described later of the driving assistance apparatus 20 may be implemented by the CPU executing programs stored in the non-transitory computer-readable media.

A road sign recognizer 21 is configured to acquire images captured by the imager 11, and recognize road signs included in the images by applying pattern matching using various predefined road sign patterns. A method for recognizing road signs in the captured images is not limited to pattern matching. In an alternative embodiment, a linear classifier may be used to recognize road signs in the captured images. The road sign recognizer 21 is configured to recognize numerical information displayed on each road sign, and store the recognized numerical information in the storage 22. The storage 22 may be configured as a rewritable, non-volatile memory.

The turn detector 23 is configured to detect a turning action of the own vehicle based on input signals, such as detection signals of various sensors mounted in the own vehicle and operation signals of various devices input by the driver. The various sensors include a vehicle speed sensor 12 adapted to detect a speed of the own vehicle, a yaw rate sensor 13 adapted to detect an angular speed (or a yaw rate) in a direction that the own vehicle is turning. The yaw rate sensor 13 corresponds to a sensor adapted to detect a steering angle of the own vehicle.

The notifier 24 is configured to, upon receipt of information (e.g., in form of a signal) representing the road sign recognized by the road sign recognizer 21 (hereinafter referred to as road sign information), notify the driver of the own vehicle of the road sign information. As an example, the notifier 24 is configured to, when the road sign indicating a speed limit is recognized, cause the alarm device 30 to notify the driver of the own vehicle of the speed limit (as numerical information) indicated on the road sign. The alarm device 30 may include a monitor 31 to display an image and a speaker 32 to output an audible alarm or a guidance voice. In the present embodiment, the monitor 31 is disposed visible to the driver of the own vehicle in the passenger compartment to display the speed limit, thereby providing to the driver speed limit information applied to the road on which the own vehicle is traveling.

The own vehicle is equipped with a turn indicator 14 to externally indicate a travel direction. The turn indicator 14 includes a turn indicator stalk to be manipulated by the driver to input a turn direction. The turn indicator stalk is manipulated into one of a left-turn indicating position, a neutral position, and a right-turn indicating position. The turn indicator 14 outputs to both the turn detector 23 and the notifier 24 a turn signal as manipulation information in response to the manipulated position.

When the own vehicle makes a left or right turn, the traveled road of the own vehicle is usually changed. The speed limit or the like applied to the traveled road may also change. If road sign information, such as a speed limit or the like, displayed on the monitor 31 before the turn remains displayed on the monitor 31 even after the turn, inaccurate road sign information may be provided to the driver of the own vehicle. Thus, there is concern about failing to provide accurate driving assistance.

The turn detector 23 is configured to detect a turning action of the own vehicle. The notifier 24 is configured to, if a turning action of the own vehicle is detected by the turn detector 23, withhold notifying the driver of the own vehicle of road sign information recognized by road sign recognizer 21 within a predetermined period of time during the turning action.

The turning action can be detected based on the speed of the own vehicle and the manipulation information of the turn indicator 14. More specifically, for example, a turning action may be detected if both the following first and second conditions are met. The first condition is that the speed of the own vehicle has decreased to below a predetermined speed. The second condition is that the turn indicator 14 has been activated.

Figure 2A:
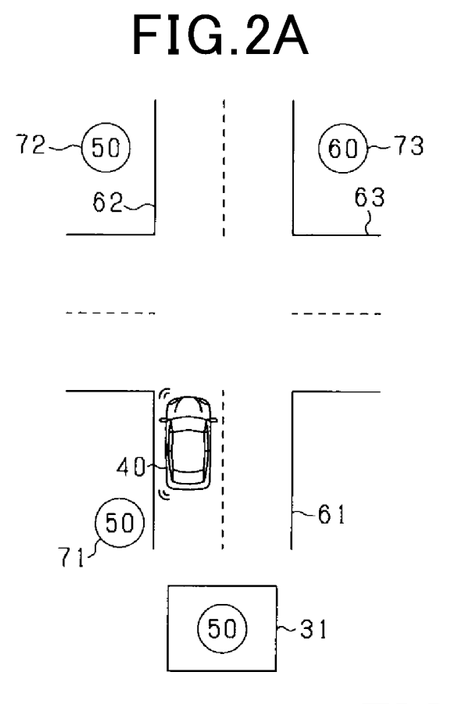
FIG. 2A illustrates an exemplary situation where an own vehicle is traveling straight prior to making a right turn.
Figure 2B:
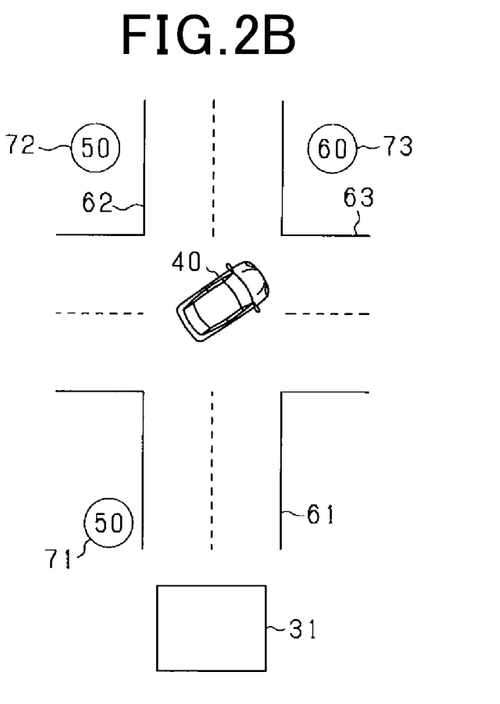
FIG. 2B illustrates an exemplary situation where the own vehicle is making the right turn.
Figure 2C:
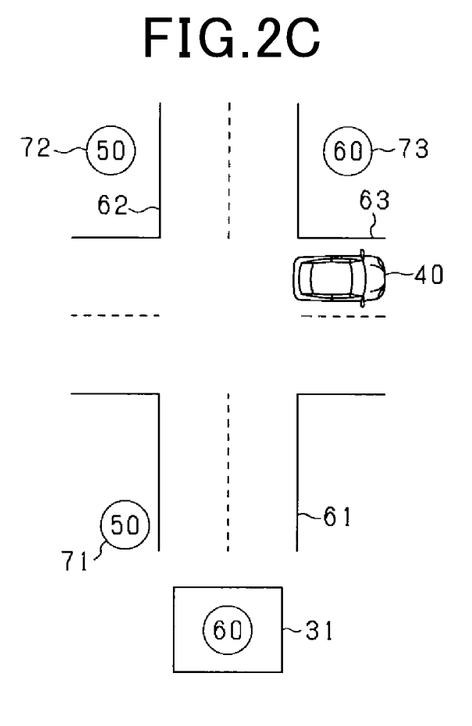
FIG. 2C illustrates an exemplary situation where the own vehicle is traveling straight after making the right turn.

FIGS. 2A-2C illustrate the change over time of display on the monitor 31 in the case of the own vehicle 40 making a right turn after traveling straight. FIG. 2A illustrates a situation where the own vehicle is traveling straight on a road 61 with a 50 km/h speed limit sign. FIG. 2B illustrates a situation where the own vehicle is making a right turn at an intersection.

Referring to FIG. 2A, in a situation where the own vehicle 40 is traveling straight on the road 61, an image of a speed limit sign 71 applied to the road 61 is captured by the imager 11. Numerical information indicated on the speed limit sign 71 is then displayed as road sign information on the monitor 31. In the example of FIG. 2A, numerical information "50" indicated on the speed limit sign 71 is displayed on the monitor 31.

In the situation of FIG. 2A where the road sign information applied to the road 61 is displayed on the monitor 31, the own vehicle 40 may reach the intersection, make a right turn at the intersection, and then travel on a road 63 going rightward as viewed from the travel direction of the own vehicle before the right turn. If the speed of the own vehicle has decreased below a decision vehicle speed Vth (i.e., if the first condition is met) and if the turn indicator 14 has been activated (i.e., if the second condition is met), notification of the road sign information to the driver will be suspended. As shown in FIG. 2B, the road sign information displayed on the monitor 31 is eliminated, which results in no road sign information being displayed.

The notifier 24 is configured to withhold notifying the driver of the own vehicle of the road sign information that is recognized by road sign recognizer 21 within a predetermined period of time during a turning action. For example, even if the speed limit sign 72 applied to the road 62 going straight ahead of the intersection is captured by the imager 11 during the turning action, the speed limit sign 72 captured within the predetermined period of time during the turning action is not displayed.

The notifier 24 may be configured to, if a steering angle of the own vehicle 40 during a turning action is equal to or less than a threshold, withhold notifying the driver of the own vehicle of the road sign information recognized by road sign recognizer 21. For example, a yaw rate may be used to calculate the steering angle of the own vehicle 40. More specifically, the notifier 24 may be configured to calculate an integrated value of the yaw rate detected by the yaw rate sensor 13 (hereinafter referred to as a yaw rate integrated value, $\Sigma\theta$), and withhold notifying the driver of the own vehicle 40 of the road sign information recognized within a period of time in which the yaw rate integrated value $\Sigma\theta$ is equal to or less than the predetermined threshold $\theta$th. Preferably, the threshold $\theta$th may be set such that the road sign information of the speed limit sign 72 applied to the road 62 going straight ahead of the intersection is excluded, but the road sign information of the speed limit sign 73 applied to the road 63 to which the own vehicle is making the right turn is not excluded. Preferably, such a threshold θth is set to less than 90 degrees, which may be set based on an angle of view of the imager 11.

A non-display state of the road sign information is continued until the speed limit sign 73 applied to the road 63 is recognized. When an image of the speed limit sign 73 applied to the road 63 is captured by the imager 11 during the right turning action or after completion of the right turn, the numerical information "60" (km/h) indicated by the speed limit sign 73 is displayed on the monitor 31 as the road sign information, as shown in FIG. 2C.

Figure 3:
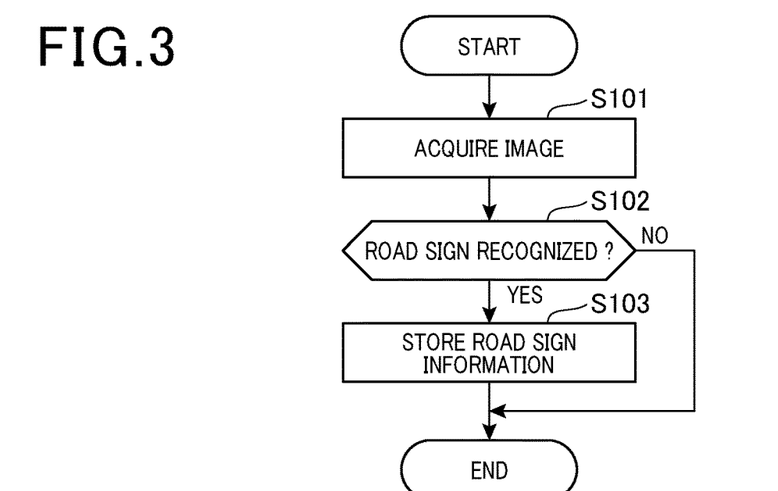
FIG. 3 is a flowchart of road sign recognition processing.

A driving assistance method of the present embodiment will now be described with reference to flowcharts of FIGS. 3-5. Processing in each of FIGS. 3-5 may be implemented by an electronic circuit which is hardware, or may at least partially be implemented by software to be executed on the microcomputer. The electronic circuit may be provided by a digital circuit including a number of logic circuits, an analog circuit, or a combination thereof.

Road sign recognition processing performed by the road sign recognizer 21 will now be described with reference to FIG. 3. This processing is iteratively performed every predetermined time interval. Referring to FIG. 3, at step S101, the road sign recognizer 21 acquires an image from the imager 11 and recognizes a road sign included in the acquired image. At step S102, the road sign recognizer 21 determines whether or not a road sign has been recognized. If at step S102 it is determined that a road sign has been recognized, then the process flow proceeds to step S103. At step S103, the road sign recognizer 21 stores road sign information representing the recognized road sign in the storage 22.

Turn detection processing performed by the turn detector 23 will now be described with reference to FIG. 4. This processing is iteratively performed by the turn detector 23 every predetermined time interval. In some other embodiments, some of steps shown in FIG. 4 may be performed by the notifier 24.

Figure 4:
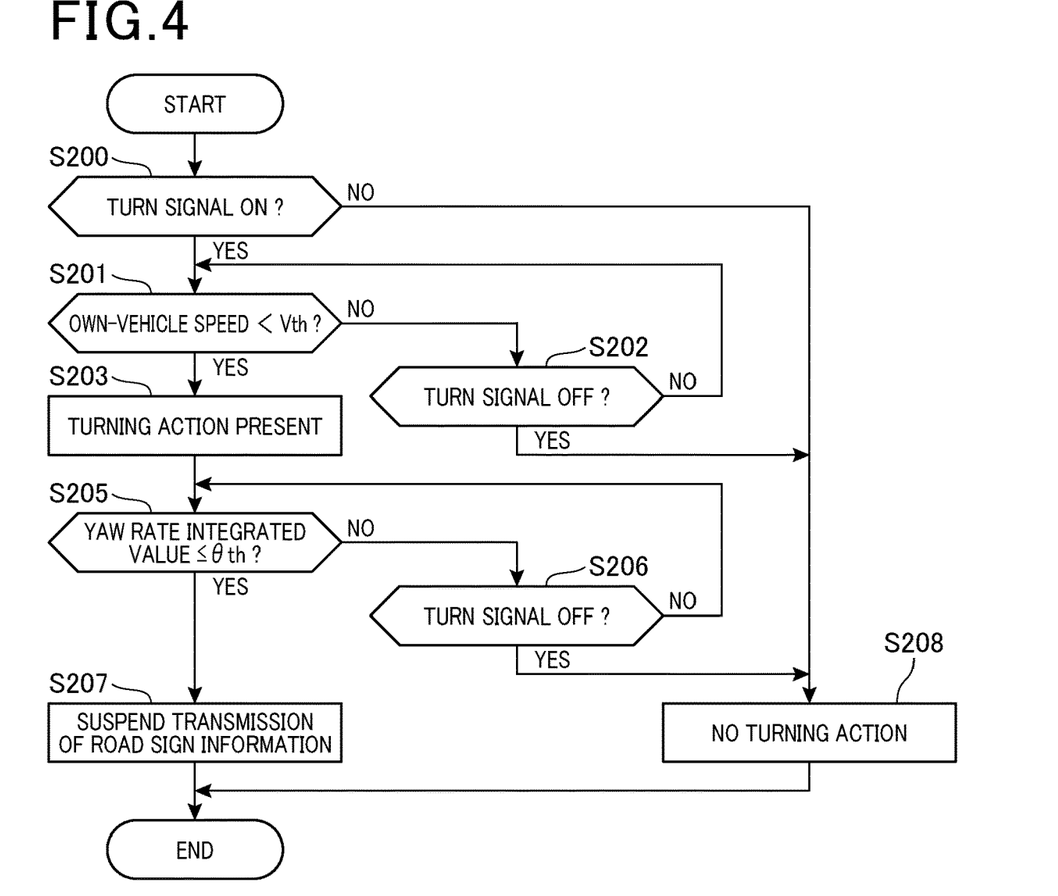
FIG. 4 is a flowchart of turn detection processing.

Referring to FIG. 4, at step S200, the turn detector 23 determines whether or not the turn signal received from the turn indicator 14 has been switched on, that is, whether or not the turn indicator stalk of the turn indicator 14 has been manipulated from the neutral position into one of the left-turn indicating position and the right-turn indicating position. If at step S200 it is determined that the turn signal received from the turn indicator 14 has been switched on, then the process flow proceeds to step S201. If at step S200 it is determined that the turn signal received from the turn indicator 14 is off, then the process flow proceeds to step S208. At step S208, the turn detector 23 determines that there is no turning action of the own vehicle 40. The process flow then ends.

At step S201, the turn detector 23 determines whether or not the vehicle speed detected by the vehicle speed sensor 12 is equal to or less than a decision vehicle speed Vth. The decision vehicle speed Vth is a criterion value of vehicle speed for determining whether or not the own vehicle 40 is about to make a turn. For example, the decision vehicle speed Vth may be set within a range of 30 to 40 km/h. In some other embodiments, step S200 and step S201 may be exchanged in order.

If at step S201 it is determined that the speed of the own vehicle 40 exceeds the decision vehicle speed Vth, then the process flow proceed to step S202. At step S202, the turn detector 23 determines whether or not the turn signal has been switched off. If at step S202 it is determined that the turn signal is on, then the process flow returns to step S201. If at step S202 it is determined that the turn signal is off, then the process flow proceeds to step S208. At step S208, the turn detector 23 determines that there is no turning action of the own vehicle 40. Thereafter, the process flow ends. More specifically, at step S208, the preprocess flow ends after transmission of the road sign information to the notifier 24 if there is road sign information recognized by the road sign recognizer 21.

For example, in the case where the driver has switched on the turn indicator 14 to make a lane change or the like, but has not performed any turning action, the turn signal will be switched from on to off before the speed of the own vehicle decreases below the decision vehicle speed Vth. In such a case, the turn detector 23 determines that the turn signal is off at step S202 (the "YES" branch of step S202), and the process flow then proceeds to step S208. At step S208, the turn detector 23 determines that there is no turning action of the own vehicle 40.

If at step S201 it is determined that the speed of the own vehicle 40 is equal to or less than the decision vehicle speed Vth, then the process flow proceeds to step S203. At step S203, the turn detector 23 determines that there is a turning action of the own vehicle 40. The process flow further proceeds to step S205. At step S205, the turn detector 23 calculates an integrated value of the yaw rate detected by the yaw rate sensor 13. The integrated value of the yaw rate is denoted by Σθ. The turn detector 23 calculates the integral with respect to time of the yaw rate in the direction indicated by the turn indicator 14 on a time interval from activation of the turn indicator 14 by manipulating the turn indicator stalk to the current time, thereby calculating the integrated value of the yaw rate, Σθ.

At step S205, the turn detector 23 determines whether or not the yaw rate integrated value Σθ is equal to or less than the threshold θth. If the yaw rate integrated value Σθ is equal to or less than the threshold θth, the process flow proceeds to step S207. At step S207, the turn detector 23 suspends transmission of the road sign information recognized by road sign recognizer 21 in a period of time from activation of the turn indicator 14 by manipulating the turn indicator stalk to the current time (that is, a period of time in which the yaw rate integrated value is equal to or less than the threshold θth) to the notifier 24.

If the yaw rate integrated value Σθ exceeds the threshold θth, then the process flow proceeds to step S206. At step S206, the turn detector 23 determines whether or not the turn signal has been switched off. If at step S206 the turn detector 23 determines that the turn signal is on, then the process flow returns to step S205, and then the road sign information recognized by the road sign recognizer 21 within a period of time in which the yaw rate integrated value re is greater than the threshold θth during the turning action of the own vehicle 40 is transmitted to the notifier 24. The road sign information recognized by the road sign recognizer 21 within the period of time in which the yaw rate integrated value Σθ is greater than the threshold θth is likely to be road sign information representing the speed limit sign 73 applied to the road 63 to which the own vehicle 40 is making a right turn.

If at step S206 the turn detector 23 determines that the turn signal has been switched off, then the process flow proceeds to step S208. At step S208, the turn detector 23 determines that there is no turning action of the own vehicle 40. The process flow then ends. For example, upon completion of the turning action, the turn signal is switched from on to off after the yaw rate integrated value Σθ has exceeded the threshold θth. In such a case, the turn detector 23 determines at step S206 that the turn signal has been switched from on to off, then the process flow proceeds to step S208. At step S208, the own vehicle 40 determines that there is no turning action of the own vehicle 40.

Notification processing performed by the notifier 24 will now be described with reference to FIG. 5. This processing is iteratively performed by the notifier 24 every predetermined time interval.

Figure 5:
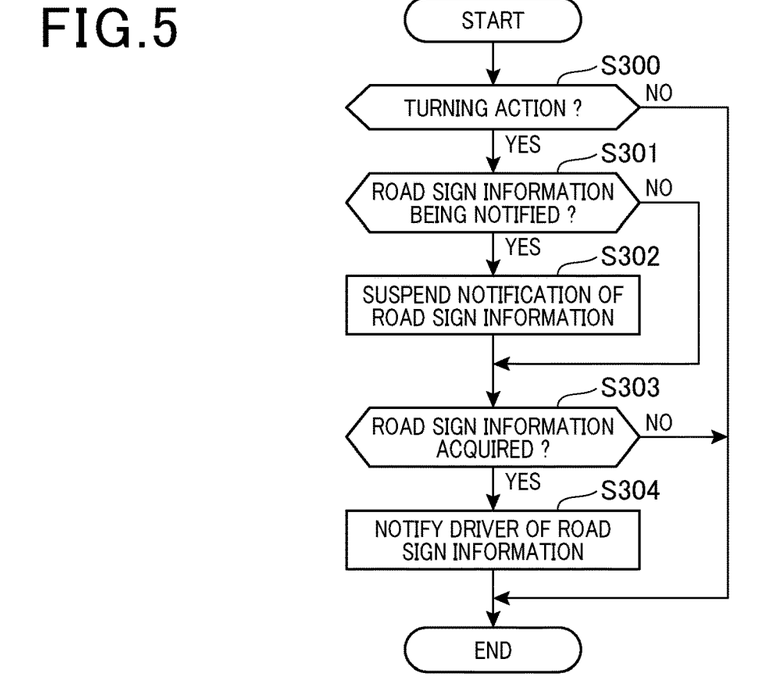
FIG. 5 is a flowchart of notification processing.

Referring to FIG. 5, at step S300, the notifier 24 determines whether or not there is a turning action of the own vehicle 40. If there is no turning action of the own vehicle 40, then the process flow ends.

If at step S300 the notifier 24 determines that there is a turning action of the own vehicle 40, then the process flow proceeds to step S301. At step S301, the notifier 24 determines whether or not the road sign information representing the road sign recognized by road sign recognizer 21 is being notified to the driver of the own vehicle 40. In the present embodiment, the notifier 24 determines whether or not the road sign information applied to a lane in which the own vehicle 40 is traveling is being displayed on the monitor 31. The lane in which the own vehicle 40 is traveling is hereinafter referred to as an own lane.

In a situation where no road sign applied to the own lane is recognized and no road sign information is thus being notified to the driver, the notifier 24 at step S301 determines that road sign information representing a road sign is not being notified to the driver, then the process flow proceeds to step S303. In a situation where road sign information is being notified to the driver, the process flow proceeds to step S302, where the notifier 24 causes the alarm device 30 to suspend notifying the driver of the road sign information. Thereafter, the process flow proceeds to step S303. At step S302, as shown in FIG. 2B, the notifier 24 eliminates the road sign information being displayed on the monitor 31.

At step S303, it is determined whether or not the notifier 24 has acquired the road sign information during the turning action. The notifier 24 has not acquired the road sign information recognized within a period of time in which the yaw rate integrated value $\Sigma\theta$ is equal to or less than the predetermined threshold $\theta$th. The notifier 24 may have acquired the road sign information recognized by the road sign recognizer 21 within a period of time in which the yaw rate integrated value $\Sigma\theta$ is greater than the predetermined threshold $\theta$th. If the notifier 24 has acquired the road sign information during the turning action, the process flow proceeds to step S304. At step S304, the notifier 24 notifies the driver of the road sign information. Thereafter, the process flow ends.

Figure 6:
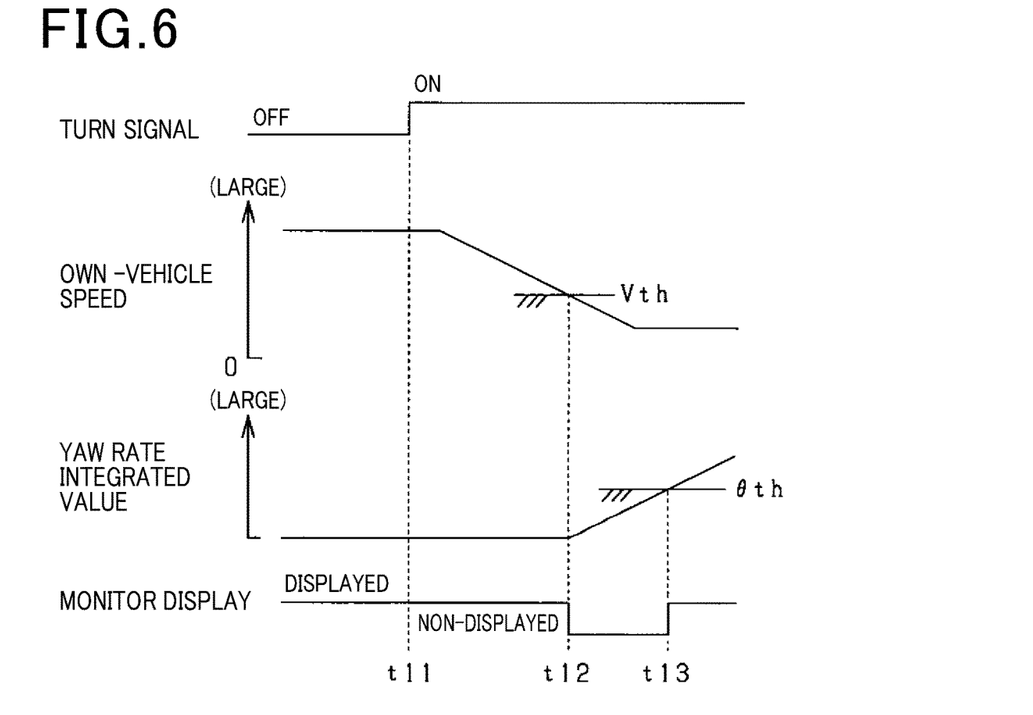
FIG. 6 is a timing diagram related to the change over time of road sign information display on a monitor.

FIG. 6 illustrates a timing diagram related to the change over time of road sign information display on the monitor 31 in the same situation as in FIGS. 2A-2C. In a situation where the own vehicle is traveling at a speed equal to or greater than the decision vehicle speed Vth, the driver activates the turn indicator 14 when making a right turn at an intersection. The turn signal is thereby switched from off to on at time t11. The speed of the own vehicle 40 is then decreased by the driver releasing the accelerator or braking to below the decision vehicle speed Vth at time t12. At this time t12, the turn detector 23 determines that there is a turning action. The road sign information displayed on the monitor 31 is eliminated, which results in no road sign information being displayed.

Once the yaw rate integrated value $\Sigma\theta$ exceeds the threshold $\theta$th as a result of steering by the driver, the road sign information recognized by the road sign recognizer 21 within a period of time in which the yaw rate integrated value $\Sigma\theta$ is greater than the threshold $\theta$th is displayed on the monitor 31 at time t13.

The embodiment set forth above can provide the following advantages.

In the above configuration of the driving assistance apparatus 20, the notifier 24 is configured to, if a turning action of the own vehicle is detected by the turn detector 23, withhold notifying the driver of the own vehicle of the road sign information representing the road sign recognized by the road sign recognizer 21 within a predetermined period of time during the turning action. This configuration enables appropriately withholding notification of road sign information representing a road sign installed at an intersection during a turning action. For example, when the road sign recognizer 21 has detected a road sign applied to a road going straight ahead of the intersection during a turning action of the own vehicle, the notifier 24 withholds notifying the driver of this road sign information. This configuration can provide a notification of accurate road sign information, thereby properly implementing driving assistance.

The turn detector 23 determines that there is a turning action if the first condition that the speed of the own vehicle has decreased to below a predetermined speed and the second condition that the turn indicator 14 has been activated are both met. With this configuration, the turning action can be discriminated from the other actions, such as a lane change.

The notifier 24 is configured to, for example, if the steering angle of the own vehicle 40 during a turning action is equal to or less than a threshold $\theta$th, withhold notifying the driver of the own vehicle of the road sign information recognized by road sign recognizer 21. The threshold $\theta$th may be set based on an angle of view of the imager 11. With this configuration, the road sign information of the speed limit sign 72 applied to the road 62 going straight ahead of the intersection may be excluded while the road sign information of the speed limit sign 73 applied to the road 63 to which the own vehicle is making a right turn may not excluded.

Other Embodiments

Although particular embodiments have been described, one of ordinary skill in the art, in light of this teaching, can generate additional embodiments and modifications without departing from the spirit of or exceeding the scope of the claimed invention. In the following, identical or equivalent components or components of equal or equivalent action are identified by the same or similar reference numerals.

(M1) The road sign information before a turning action may be eliminated, for example, before the turning action, during the turning action, or after completion of the turning action.

(M2) In the embodiment set forth above, the yaw rate integrated value $\Sigma\theta$ is used as a parameter related to the steering angle of the own vehicle 40, and notifying the driver of the own vehicle of the road sign information is suspended, if the yaw rate integrated value $\Sigma\theta$ exceeds the threshold $\theta$th. In an alternative embodiment, a detection value of a steering angle sensor adapted to detect a steering angle of the steering wheel manipulated by the driver of the own vehicle 40 may be used as a parameter related to the steering angle of the own vehicle.

(M3) In the embodiment set forth above, the turning action is detected based on the speed of the own vehicle and manipulation information of the turn indicator 14. In an alternative embodiment, the turning action may be detected based on the steering angle of the own vehicle 40 or other parameters.

(M4) In the embodiment set forth above, if at any one of steps S200, S202, and S206 shown in FIG. 4 it is determined that the turn signal is off, then at step S208 it is determined that there is no turning action. In an alternative embodiment, at step S208, a determination as to whether or not there is a turning action may be made until a predetermined time (e.g., a few seconds) has elapsed since the turn signal was switched off.

(M5) Conditions for determining whether or not there is a turning action of the own vehicle 40 may include conditions other than the condition related to the speed of the own vehicle, the condition related to manipulation information of the turn indicator 14, and the condition related to the steering angle. For example, the conditions for determining whether or not there is a turning action of the own vehicle 40 may include a condition for determining whether or not the traveled road has changed based on the images captured by the imager 11 and data acquired from the navigation system.

(M6) In the embodiment set forth above, the road sign information representing the road sign detected by the sign recognizer 21 is displayed on the monitor 31. In an alternative embodiment, the road sign information representing the road sign detected by the sign recognizer 21 may be output as audio from the speaker 32, or may be displayed on the monitor 31 and output as audio from the speaker 32. The road signs to be notified to the driver of the own vehicle may include other road signs other than the speed limit sign.

(M7) The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

What is claimed is:

1. An apparatus for assisting a driver of a vehicle in driving the vehicle, comprising:
   a non-transitory memory storing one or more computer programs; and
   a processor executing the one or more computer programs to:
      recognize a road sign from an image captured by a vehicle-mounted imager;
      notify the driver of the vehicle of road sign information representing the road sign recognized;
      determine whether a turn indicator has been activated;
      determine whether a speed of the vehicle has decreased to below a predetermined speed;
      determine a presence of a turning action of the vehicle solely in response to determining that both the turn indicator has been activated and the speed of the vehicle has decreased to below a predetermined speed; and
      in response to determining the presence of the turning action of the vehicle, withhold notifying the driver of the vehicle of the road sign information representing the road sign recognized within a period of time from when the presence of the turning action of the vehicle is determined, the period of time determined based on a steering angle of the vehicle in which the steering angle of the vehicle is equal to or less than a threshold.

2. The apparatus according to claim 1, wherein the threshold is set based on an angle of view of the vehicle-mounted imager.

3. The apparatus according to claim 1, wherein the steering angle of the vehicle is determined based on an integrated value of yaw rate detected by a yaw rate sensor.

4. The apparatus according to claim 1, wherein the road sign that is recognized is a speed limit sign.

5. A method for assisting a driver of a vehicle in driving the vehicle, comprising:
   recognizing a road sign from an image captured by a vehicle-mounted imager;
   notifying the driver of the vehicle of road sign information representing the road sign recognized;
   determining whether a turn indicator has been activated;
   determining whether a speed of the vehicle has decreased to below a predetermined speed;
   determining a presence of a turning action of the vehicle solely in response to determining that both the turn indicator has been activated and the speed of the vehicle has decreased to below a predetermined speed; and
   in response to determining the presence of the turning action of the vehicle, withholding notifying the driver of the vehicle of the road sign information representing the road sign recognized within a period of time from when the presence of the turning action of the vehicle is determined, the period of time determined based on a steering angle of the vehicle in which the steering angle of the vehicle is equal to or less than a threshold.

6. An apparatus for assisting a driver of a vehicle in driving the vehicle, comprising:
   a processor;
   a non-transitory computer-readable storage medium; and
   a set of computer-executable instructions stored on the computer-readable storage medium that cause the processor to implement:
      obtaining a road sign signal representing a road sign recognized from an image captured by a vehicle-mounted imager;
      outputting a notifying signal to a notifier for notifying the driver of the vehicle of the road sign represented by the road sign signal;
      determining whether a turn indicator has been activated;
      determining whether a speed of the vehicle has decreased to below a predetermined speed;
      determine a presence of a turning action of the vehicle solely in response to both determining that both the turn indicator has been activated and the speed of the vehicle has decreased to below a predetermined speed; and
   wherein the processor withholds notifying the driver of the vehicle of the road sign represented by the road sign signal within a period of time from when the presence of the turning action of the vehicle is determined, the period of time determined based on a steering angle of the vehicle in which a steering angle of the vehicle is equal to or less than a threshold.

* * * * *